(12) United States Patent
Kao et al.

(10) Patent No.: US 7,500,016 B2
(45) Date of Patent: *Mar. 3, 2009

(54) PLUG AND PLAY NODE ADDITION IN A DUAL RING TOPOLOGY NETWORK USING DISCOVERED TOPOLOGY INFORMATION FOR DETERMINING ROUTING DECISIONS

(75) Inventors: Jung-Hong Kao, Los Altos, CA (US); Necdet Uzun, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 11/440,477

(22) Filed: May 25, 2006

(65) Prior Publication Data

US 2006/0212551 A1    Sep. 21, 2006

Related U.S. Application Data

(63) Continuation of application No. 09/898,920, filed on Jul. 2, 2001, now Pat. No. 7,054,951.

(51) Int. Cl.
G06F 15/173    (2006.01)
(52) U.S. Cl. ....................................... 709/242; 709/251
(58) Field of Classification Search ................. 709/242, 709/251; 370/407, 223, 431, 403, 437
See application file for complete search history.

(56) References Cited

U.S. PATENT DOCUMENTS

| | | | | |
|---|---|---|---|---|
| 4,554,659 A | * | 11/1985 | Blood et al. | 370/437 |
| 4,982,400 A | * | 1/1991 | Ebersole | 370/407 |
| 5,150,356 A | * | 9/1992 | Tsutsui | 370/223 |
| 5,864,680 A | * | 1/1999 | Edblad et al. | 709/242 |
| 5,949,788 A | * | 9/1999 | Friedman et al. | 370/431 |
| 7,054,951 B1 | * | 5/2006 | Kao et al. | 709/242 |
| 2002/0018481 A1 | * | 2/2002 | Mor et al. | 370/403 |

OTHER PUBLICATIONS

D. Tsiang and G. Suiwala—Network Working Group, "The Cisco SRP MAC Layer Protocol," Requst for Comments: 2892, Cisco Systems, Aug. 2000, pp. 1-52.

* cited by examiner

*Primary Examiner*—Le Luu
(74) *Attorney, Agent, or Firm*—Campbell Stephenson LLP

(57) ABSTRACT

A method and apparatus for adding a node to a network where the network includes a plurality of nodes connected by first and second rings formed by two or more transmission media. The method includes connecting the node to each of the first and second rings, determining a ring identifier for each of the first and second rings coupled to the node after connection, discovering topology information for the network including the identity of each node coupled to each ring, storing the topology information and determining routing decisions for one or more packets received at the node along each of the first and second rings using the ring identifier information.

21 Claims, 8 Drawing Sheets

| 502 | 504 ADDRESS (MAC, IP) | 508 HOP COUNT INNER | 508 HOP COUNT OUTER | 510 LATENCY INNER | 510 LATENCY OUTER | 512 STATIC RING DIRECTION | 514 DYNAMIC RING DIRECTION | 506 RING ID INNER | 506 RING ID OUTER |
|---|---|---|---|---|---|---|---|---|---|
| | 12, 23, 46 | 10 | 8 | 1234 | 1456 | I | O | I | O |
| | 12, 23, 47 | 9 | 9 | 1200 | 1400 | I | I | I | O |

PLUG AND PLAY NODE ADDITION IN A DUAL RING TOPOLOGY NETWORK USING DISCOVERED TOPOLOGY INFORMATION FOR DETERMINING ROUTING DECISIONS

This application is a continuation of U.S. patent application Ser. No. 09/898,920, entitled "Plug And Play Node Addition In A Dual Ring Topology Network," filed Jul. 2, 2001 now U.S. Pat. No. 7,054,951, and naming Jung-Hong Kao and Necdet Uzun as the inventors.

BACKGROUND

The present invention is directed to network communications.

A communications network such as network 100 of FIG. 1 may include a plurality of stations or nodes (nodes A-F) coupled by transmission media (e.g., cable wire or optical fiber) providing a path for the transmission of data (e.g., E-mail, video, multimedia, or voice) between two or more nodes (e.g. transmission media 140 between nodes A and B, and transmission media 141 between nodes B and C). The data can be transferred in accordance with a network protocol (e.g., Internet Protocol (IP), asynchronous transfer mode (ATM), or synchronous optical network/synchronous digital hierarchy (SONET/SDH)) over optical transmission media. The network 100 may include one or more central nodes and one or more branch nodes connected by an inner ring 126 and an outer ring 146. In this type of network configuration (a dual-ring topology), data can be transmitted from a source node to a destination node (often through intermediary nodes) by transmitting data along one of the two rings (e.g., inner ring 126 or outer ring 146), where the rings have traffic flowing in opposing directions (clockwise direction 110 or counterclockwise direction 111). Control information can be routed in a direction opposite the control information's respective data. As data enters each successive node, local data is split off and transit data passes through the node along the ring. In addition, local data may be added at each node (i.e., transmit data), integrated with the transit data and forwarded on a respective ring to a next node in the network.

Data is received in a node (e.g., node B) along a transmission media (e.g., transmission media 140 of outer ring 146 (FIG. 1)). The data received is generally in packet format, where each packet has a header, indicating source and destination information along with a ring identifier. As packets are received at a node, the packets are routed using the destination information in the packet header to determine if the packet is destined for the local host (local traffic) or should be forwarded along a ring to another node in the network (transit traffic). The ring identifier is used to determine whether the traffic is wrap traffic. Wrap traffic refers to traffic that was originally placed on one ring of the network, but due to congestion or failures in the network, has been redirected to the other ring.

When nodes are added to a network, each node must discover the other nodes in the network in order to make appropriate routing decisions. For example, when local traffic is added to a ring, the decision as to on which ring to add the traffic can be made based on the shortest path. The shortest path determination requires knowledge of each node in the network between the node and a given destination. In addition, routing decisions or traffic congestion determinations can be made based on the type of traffic that is received. As described above, each packet includes a ring identifier. Traffic that is wrap traffic may be prioritized differently than other transit traffic for a given ring. Conventional networks require that each ring be identified at the time of installation, and more specifically, that each of the ports for the node be correctly wired to a respective inner or outer ring of the network. If a given node's ports are reversed, the node will not function. As such, conventional networks do not support plug-and-play nodes that are capable of discovering which ring is which, and adapt to a given configuration.

SUMMARY

In one aspect, the invention provides a method for a method for initializing a node in a network where the network includes a plurality of nodes connected by first and second rings formed by two or more transmission media. The method includes connecting the node to each of the first and second rings, setting a locally significant ring identifier for each of the first and second rings without concern for the ring identifier established by any other node in the network for either of the two rings, discovering the locally significant ring identifiers for each other node coupled to the network, storing the locally significant ring identifiers and associated node addresses for each node in the network and determining routing decisions for one or more packets received at the node along each of the first and second rings using the locally significant identifiers associated with a node that sent the packets.

Aspects of the invention can include one or more of the following features. The step of storing can include storing the locally significant ring identifiers and associated node addresses for each ring in a table. The step of discovering the locally significant ring identifiers can include generating a topology packet including the locally significant identifier for a ring and the address of the node and sending the topology packet to a next node in the network, receiving a topology packet back on the ring that includes an address for each node on the network coupled to the ring including a locally significant identifier for the ring for each node and storing the locally significant identifier for the ring for each node.

In another aspect the invention provides a method for initializing a node in a network where the network includes a plurality of nodes connected by first and second rings formed by two or more transmission media. The method includes connecting the node to each of the first and second rings, determining a ring identifier for each of the first and second rings coupled to the node after connection, discovering topology information for the network including the identity of each node coupled to each ring, storing the topology information and determining routing decisions for one or more packets received at the node along each of the first and second rings using the ring identifier information.

Aspects of the invention can include one or more of the following features. The process of determining a ring identifier for each of the first and second rings can include generating a ring query packet that includes a proposed ring identifier for one ring, forwarding the ring query packet to a next node on the one ring and waiting for a response that includes information for determining a correct ring identifier for the one ring. The step of waiting for a response can include, if a broadcast identifier is received that indicates an identity for one of the first or second rings, then assigning ring identifiers for the node in accordance with the broadcast identifier. The step of waiting for a response can include, if the ring query packet is returned on the one ring, setting the ring identifier for the one ring to the proposed ring identifier, setting a ring identifier for a second one of the first and second rings to a complementary value and broadcasting the ring identifier on the one ring.

The step of waiting for a response can include receiving a response from another node on the network that includes an indication of a correct ring identifier for the one ring and setting the ring identifier for the one ring to the correct ring identifier. The step of waiting for a response can include receiving a ring query packet on the one ring from another node and evaluating the received ring query packet to determine if the query should be forwarded on the one ring. If the received ring query packet is to be forwarded, the method can wait for a broadcast identifier indicating a correct ring identifier for the one ring.

The step of evaluating can include comparing the addresses of the node that generated the received ring query packet and the node and determining which node, among the node that generated the received ring query and the node, should set the ring identifier for the one ring. If the node is to set the ring identifier for the one ring, then the packet can be dropped without forwarding the received ring query packet to a next node on the one ring. The step of determining can include selecting a node with the highest or lowest MAC address. The step of determining a ring identifier for each of the first and second rings coupled to the node after connection can include setting a locally significant ring identifier for each of the first and second rings without concern for the ring identifier established by any other node in the network for either of the two rings, discovering the locally significant ring identifiers for each other node coupled to the network and storing the locally significant ring identifiers and associated node addresses for each node in the network. The determining step can include determining routing decisions for one or more packets received at the node along each of the first and second rings using the locally significant identifiers associated with a node that sent the packets.

The step of storing can include storing the locally significant ring identifiers and associated node addresses for each ring in a table. The step of discovering the locally significant ring identifiers can include generating a topology packet including the locally significant identifier for a ring and the address of the node and sending the topology packet to a next node in the network, receiving a topology packet back on the ring that includes an address for each node on the network coupled to the ring including a locally significant identifier for the ring for each node and storing the locally significant identifier for the ring for each node.

In another aspect, the invention provides a method for initializing a node in a network where the network includes a plurality of nodes connected by first and second rings formed by two or more transmission media. The method includes connecting the node to each of the first and second rings and determining a ring identifier for each of the first and second rings coupled to the node after connection. Determining a ring identifier includes generating a ring query packet that includes a proposed ring identifier for one node, forwarding the ring query packet to a next node on the one ring and waiting for a response that includes information for determining a correct ring identifier for the one ring. The method includes determining routing decisions for one or more packets received at the node along each of the first and second rings using the ring identifier information.

Aspects of the invention can include one or more of the following features. The step of waiting for a response can include, if a broadcast identifier is received that indicates an identity for one of the first or second rings, then assigning ring identifiers for the node in accordance with the broadcast identifier. The step of waiting for a response can include, if the ring query packet is returned on the one ring, setting the ring identifier for the one ring to the proposed ring identifier, setting a ring identifier for a second one of the first and second rings to a complementary value and broadcasting the ring identifier on the one ring. The step of waiting for a response can include receiving a response from another node on the network that includes an indication of a correct ring identifier for the one ring and setting the ring identifier for the one ring to the correct ring identifier. The step of waiting for a response can include receiving a ring query packet on the one ring from another node and evaluating the received ring query packet to determine if the query should be forwarded on the one ring. If the received ring query packet is to be forwarded, the process can wait for a broadcast identifier indicating a correct ring identifier for the one ring.

In another aspect, the invention provides a computer program for initializing a node in a network where the network includes a plurality of nodes connected by first and second rings formed by two or more transmission media. The computer program includes instructions for causing a computer to connect a node to each of the first and second rings, set a locally significant ring identifier for each of the first and second rings without concern for the ring identifier established by any other node in the network for either of the two rings, discover the locally significant ring identifiers for each other node coupled to the network, store the locally significant ring identifiers and associated node addresses for each node in the network and determine routing decisions for one or more packets received at the node along each of the first and second rings using the locally significant identifiers associated with a node that sent the packets.

In another aspect, the invention provides a computer program for initializing a node in a network including instructions for causing a computer to connect the node to each of the first and second rings, determine a ring identifier for each of the first and second rings coupled to the node after connection, discover topology information for the network including the identity of each node coupled to each ring, store the topology information and determine routing decisions for one or more packets received at the node along each of the first and second rings using the ring identifier information.

In another aspect, the invention provides a computer program for initializing a node in a network including instructions for causing a computer to connect the node to each of the first and second rings, determine a ring identifier for each of the first and second rings coupled to the node after connection including generating a ring query packet that includes a proposed ring identifier for one node, forwarding the ring query packet to a next node on the one ring and waiting for a response that includes information for determining a correct ring identifier for the one ring and determine routing decisions for one or more packets received at the node along each of the first and second rings using the ring identifier information.

In another aspect, the invention provides a node in a network including an interface for connecting the node to each of first and second rings, means for setting a locally significant ring identifier for each of the first and second rings without concern for the ring identifier established by any other node in the network for either of the two rings, means for discovering the locally significant ring identifiers for each other node coupled to the network, a memory for storing the locally significant ring identifiers and associated node addresses for each node in the network and logic for determining routing decisions for one or more packets received at the node along each of the first and second rings using the locally significant identifiers associated with a node that sent the packets.

In another aspect, the invention provides, a node in a network including an interface for connecting the node to each of first and second rings, means for determining a ring identifier for each of the first and second rings coupled to the node after connection, means for discovering topology information for the network including the identity of each node coupled to each ring, a memory for storing the topology information and logic for determining routing decisions for one or more packets received at the node along each of the first and second rings using the ring identifier information.

Aspects of the invention can include one or more of the following advantages. A system is proposed that allows for the easy discovery of network topology in a dual ring network. Nodes can be added in a plug-and-play style to the network and can discover the topology of the network without having to be instructed which ring is the inner or outer ring. In one implementation, a system is proposed where the ring identifier for each ring coupled to a node can have local significance only. Accordingly, no global ring identifier must be maintained for a given ring. Alternatively, a detector can be provided to allow for the detection of the appropriate ring identifier for a given ring once a node is inserted into the network.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention provides a system and method for installing, plug-and-play style, a node in a network. A number of terms are used herein to describe network transmissions and related structures and processes.

"Transit traffic" refers to traffic received at a node on a ring that is destined for another node in the ring or another element of the communication network and as such is merely passed through the respective node. Transit traffic is stored at least temporarily in a transit traffic buffer. The transit traffic buffer can include low and high priority queues.

"Transmit traffic" refers to traffic received at a node from a node's respective host that is to be added to a ring. The transmit traffic is also stored at least temporarily in a transmit buffer prior to introduction to the ring. The transmit traffic and transit traffic buffers are serviced in accordance with fairness logic that is described in greater detail below.

"Topology discovery packet" refers to a periodically generated data packet that is sent to other nodes in the network that is used to discover the topology of the network. The topology discovery packet initially only includes a ring identifier and an address for the node that generated the topology packet. As the packet traverses the network, nodes append their addresses and ring identifier to the packet. When the packet returns to the origination node, the addresses for each node in the network can be discovered along with ring information. The structure and processing of topology discovery packets is discussed in greater detail below.

Figure 1:
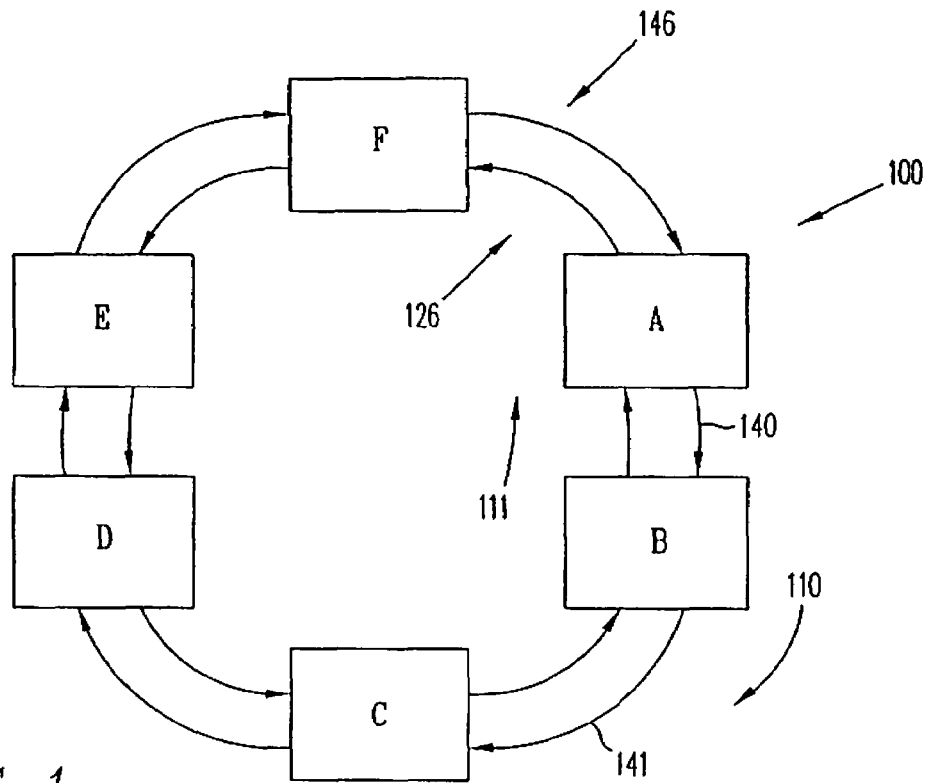
FIG. 1 is a diagram of a prior art six-node bi-directional ring topology network.
Figure 2:
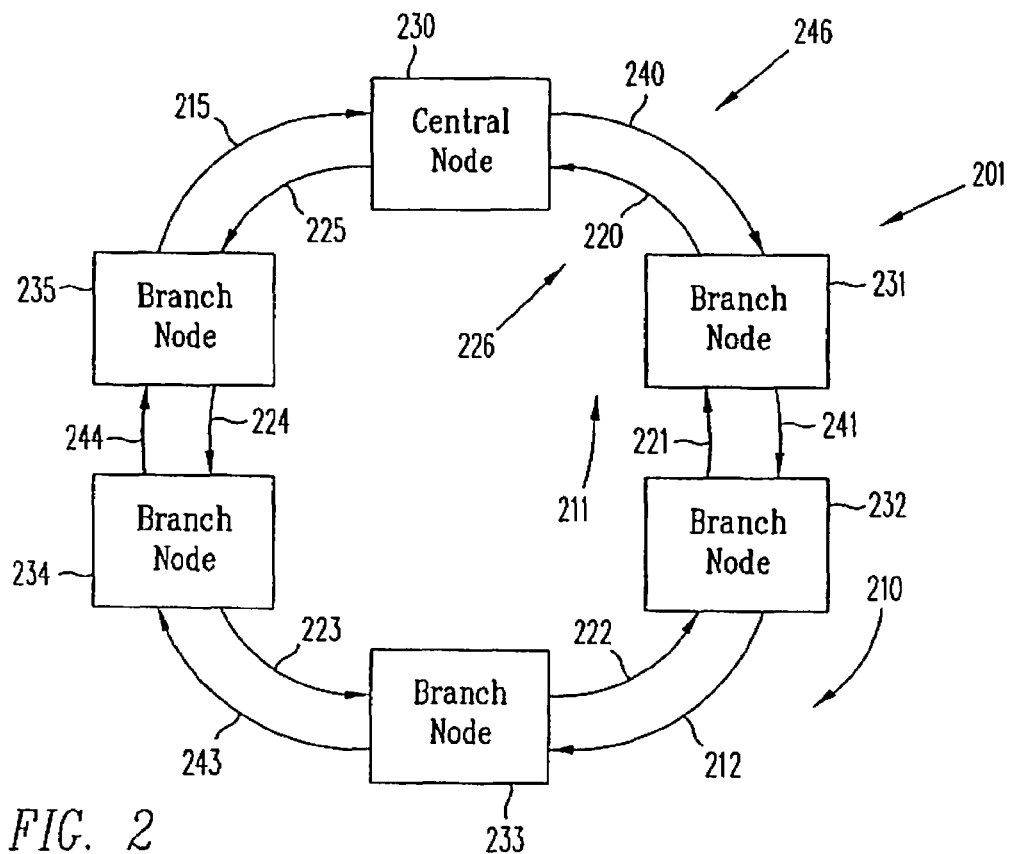
FIG. 2 is a diagram of a six-node bi-directional ring topology network.

Referring to FIG. 2, network 201 includes a six-node bidirectional dual ring topology. Network 201 may represent without limitation a metropolitan area telecommunications system, a local or wide area network, or a cable television network. Central node 230 is connected to branch nodes 231-235 via transmission media 220-225 (forming an inner ring 226) and 240-245 (forming an outer ring 246). Central node 230 can be configured to forward data to a destination external to the inner and outer rings 226 and 246 such as other networks (for example LANs or WANs). Central node 230 can also receive data from external destinations for forwarding to branch nodes 231-235. Inner and outer rings (226 and 246) may concurrently transport data in opposing directions. Control information associated with the data may be routed in the direction opposite to the direction in which the data associated with the control information is routed. Control information may include IPS (Intelligent Protection Switching) packets, usage packets, and topology discovery packets. IPS packets may include information about the network 201. Usage packets indicate the usage of the network's resources and include congestion information. In one implementation, each usage packet includes usage information for one or more downstream nodes. Topology discovery packets may be used to discovery information about the network 201. One use of topology discovery packets is described in greater detail below in association with FIGS. 3a-c.

Figure 4:
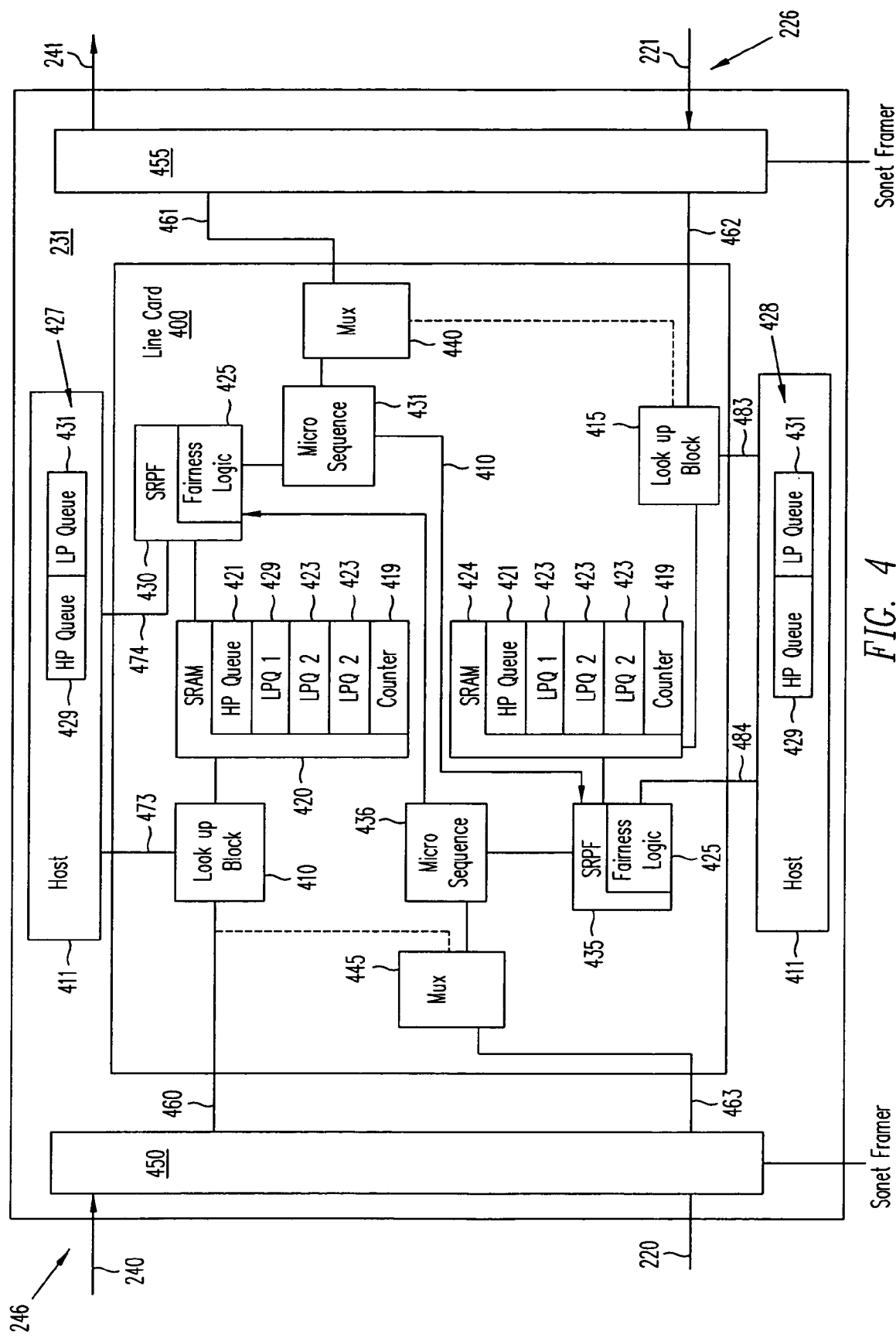
FIG. 4 is a diagram of node B of FIG. 2.

Branch nodes 231-235 may each be associated with a host (such as a network processor) (not shown), and contain a number of line cards (such as line card 400, FIG. 4), and one or more physical layers, such as SONET framers (450 and 455, FIG. 4). Each line card may exist on a single semiconductor chip.

Transmission media 220-225 and 240-245 may be fiber or cable or any other transmission media. Transmission media 220-225 route data from one node to another in counterclockwise direction 211. Transmission media 240-245 route data from one node to another in clockwise direction 210. Data transmitted along inner and outer rings 226 and 246 may include without limitation streaming video, E-mail, multimedia, or voice over IP. The data may be transmitted as packets, with headers indicating source and destination addresses.

Nodes 230-235 may be operable to receive data from any other node in the network or directly from a host (input 474 of FIG. 4 receiving information from a host 411 along the outer ring 246, and input 484 of FIG. 4 receiving information from a host 411 along the inner ring 226). When non-adjoining nodes communicate, data passes through intermediary nodes. Once data reaches its destination, the data is stripped from the incoming stream of data (e.g., dropped data). Stripping may be accomplished with a look-up table based on the destination address. Data packets that are not stripped (i.e., transit data)

are multiplexed with any new data arriving from the host (i.e., transmit data) and routed along a respective inner or outer ring (226 or 246).

FIG. 4 shows a node of FIG. 2 in more detail. Data is received in the node (e.g., node 231) along a transmission media (e.g., transmission media 240 of outer ring 246 (FIG. 2). Data may be received in packet format, where each packet has a header, indicating source and destination information. Data packets may be routed through physical layer 450, into line card 400 and be received by lookup block 410 along path 460. Lookup block 410 may consist of a lookup table. Lookup block 410 may use the destination information in the packet header to determine if the packet is destined for the host 411 (local traffic) or destined for the outer ring 246 (transit traffic). Local traffic may be forwarded to the host via output 473.

The lookup block 410 also performs a forwarding function, forwarding transit traffic to a local buffer-SRAM (Static Random Access Memory) 420, and can perform a stripping function, stripping information from particular sources based on the source information in the header or ring identifier (for wrap traffic). The stripping function may prevent the host from receiving packets from undesirable sources and can be used to alleviate congestion on the ring. Transit traffic is routed to, and stored in, SRAM 420. SRAM 420 can include two classes of transit queues, high priority and low priority. SRAM 420 can include one high priority transit queue 421 and a plurality (i) of low priority queues ($423_{1-i}$). A low priority queue counter 419 is provided to keep track of the total number of bytes in all of the low priority queues 423. The low priority queues can be treated as a set for the purposes of forwarding decisions and latency calculations. The low priority queues can be serviced in accordance with a strict priority or in weighted round robin (wrr) fashion. Accordingly, service differentiation can be provided among the various low priority queues. The low priority queue counter 419 provides an indication of the total amount of traffic in all low priority transit queues 423, which information can be used in conjunction with information derived from the high priority transit queue 421 to make forwarding decisions.

A Spatial Reuse Protocol Forwarding (SRPF) block 430 arbitrates between the transit traffic stored in SRAM 420 (i.e., traffic stored in high priority transit queue 421 and the plurality of low priority transit queues 423) and the host data received at input 474, multiplexing the transit traffic and host data optionally using SRP fairness logic 425. Each node on the ring includes two full duplex ports. One is connected to the inner ring 126 and one is connected to the outer ring 146. The Spatial Reuse Protocol Forwarding (SRPF) block 430 arbitrates between the transit traffic and the host data received (transmit traffic), using SRP fairness logic 425, such as the fairness logic described in "The Cisco SRP MAC Layer Protocol", by Tsiang and Suwala, RFC 2892 (August 2000). The SRP fairness logic is a transmission control logic, which attempts to ensure that nodes get equal usage. The SRP fairness logic determines if a node is sourcing or forwarding an excessive amount of traffic and either imposes rate controls and/or originates and propagates fairness information, requesting that one or more upstream nodes adjust their transmission rates. The logic can also be used to prioritize packets and expedite the handling of priority packets. Other examples of SRP fairness logic are described in the co-pending and commonly owned application entitled "Weighted Fairness Decisions in a SRP Forwarding Block", to Necdet Uzun et. al., filed May 11, 2001, and assigned serial number (unknown), the contents of which are expressly incorporated herein by reference.

Host data is stored in a host buffer 427 that can include high 429 and low priority transmit queues 431. Each node 230-235 of FIG. 2 may use the SRP fairness logic 425 to monitor the number of packets sourced and forwarded by the inner and outer rings 226 and 246. When a node is sourcing or forwarding an excessive amount of traffic, the node may communicate this usage information to upstream nodes via the opposite ring. The upstream nodes may then adjust their transmission rates.

Information (e.g., usage and topology packets) can be communicated to the SRP fairness logic 425 running in SRPF 435 through the use of a microsequencer 431 placed in outer ring 246 between the SRPF 430 and the multiplexer 440. The microsequencer 431 may be connected to the SRPF 435 on the inner ring 226, thus communicating information (e.g., traffic or network data) to the opposing ring. Control information can flow in the opposite direction as data it measures, such that the traffic data communicated to the SRPF 435 will reflect the traffic on the inner ring 226. The traffic data can be used by SRPF 435 to regulate traffic on the inner ring 226. Similarly, traffic data can be communicated to the SRP fairness logic running in SRPF 430 through the use of a microsequencer 436 placed in inner ring 226 between the SRPF 435 and the multiplexer 445.

Once data has been routed out of SRPF 430, the data passes through multiplexer 440 and out path 461. The data is routed through the physical layer 455 and back to outer ring 246 (FIG. 2) via transmission media 241.

Similarly, data is received in the node (e.g., node 231) along transmission media 221 of inner ring 226 (FIG. 2). Data packets may be routed through physical layer 455, into line card 400 and into lookup block 415 along path 462. Local traffic may be forwarded to the host 411 via output 483. Transit traffic may be forwarded to and stored in SRAM 424. SRPF block 435 arbitrates between the transit traffic stored in SRAM 424 and the host data received at input 484, multiplexing the transit traffic and host data using the weighted SRP fairness logic 425. Once data has been routed out of SRPF 435, the data passes through multiplexer 445 and out path 463. The data is then routed through the physical layer 450 and back to inner ring 226 (FIG. 2) via transmission media 220 (FIG. 2).

Topology Discovery

Figure 3A:
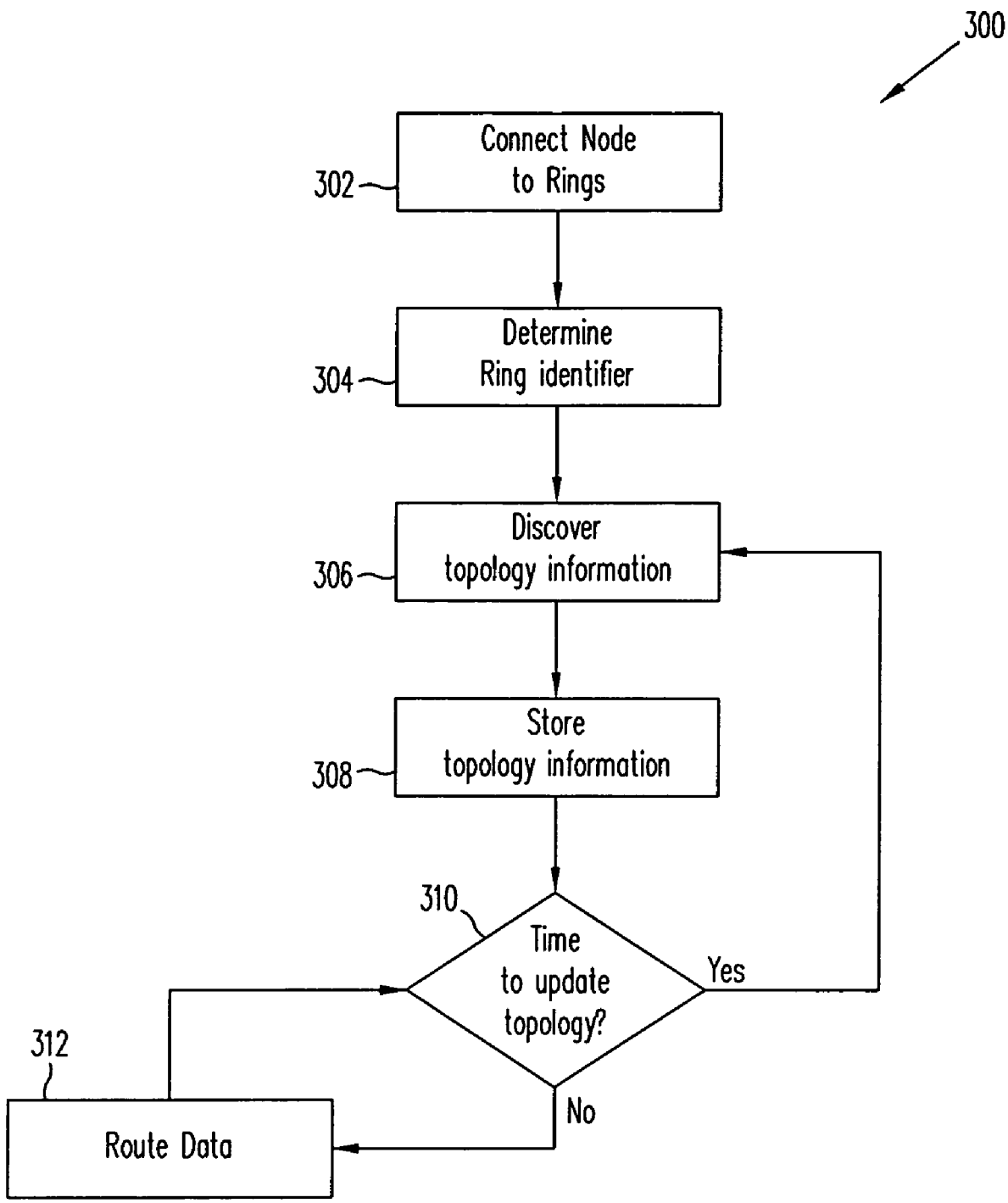
FIG. 3a is a flow chart illustrating a plug-and-play process for installing a node in a dual ring topology network.

Referring now to FIG. 3a, a process is shown for adding a node to the network 201. The node can be added at any location. The addition of the node requires both discovery on the part of the added node of the topology of the network and discovery of the new node by the existing nodes in the network. Discovery is facilitated through the use of topology discovery packets. A topology discovery packet is generated by a given node, traverses the network collecting information along the way and returns to the origination node with information that can be used to determine the topology of the network. At each node the packet traverses, information about that node can be appended to the topology discovery packet. Topology discovery packet processing is described in greater detail below.

The process begins at step 302. A node is installed in the network by connecting each of the node's ports to one of the respective rings (302). Thereafter, a ring identifier is determined for each ring (304).

The ring identifier can be determined locally, that is, a ring identifier can be assigned to each of the respective rings. If the ring identifier is assigned, then the assignment is only locally significant. That is, the respective rings need not be identified per se as either inner or outer. In this configuration, each node in the network determines on its own a "locally inner" and "locally outer" ring. The local definition however must be communicated to other nodes in the network, so that each node can determine whether data arriving from a particular node on a particular ring was originally intended for a given ring, or is wrap data. The process for discovering locally significant ring identifiers is described in greater detail in FIGS. 3b-c.

Figure 3B:
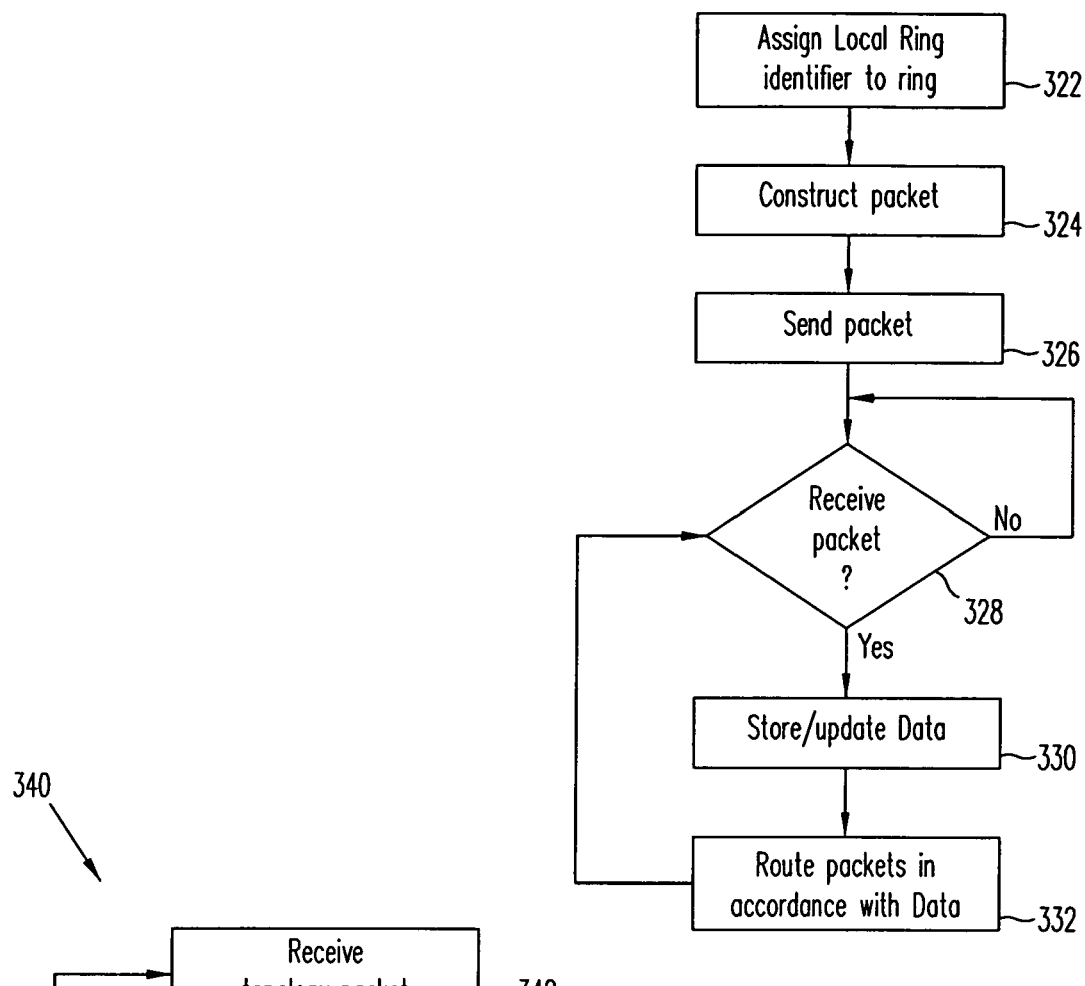
FIG. 3b is a flow chart illustrating a process for determining network topology in a network where ring identifiers are only locally significant.

Alternatively, the ring identifier for each ring can be determined by querying other nodes in the network. The process for querying other nodes in the network is discussed in greater detail below in FIG. 3d. After the ring identifier for each ring is assigned, topology information for the network is discovered (306). The ring topology can be discovered using topology discovery packets. Where the ring identifier has only local significance, the network topology is discovered during the ring identifier determination process described in association with FIGS. 3b-c. Alternatively, a topology discovery packet can be generated and transmitted to a downstream node for processing. A method for processing topology discovery packets is shown in FIG. 3e.

After topology information is discovered, the topology information is stored (308). Thereafter, a repetitive loop is entered that includes a check to determine if the topology information needs to be updated (310). The loop includes conventional routing processes (312) including receiving, forwarding and interjecting traffic on each respective ring. At a time for updating the topology information, the topology discovery process can be invoked at step 306. The time for updating can arise at the receipt of a topology packet from another node in the network. Alternatively, topology discovery packets can be generated at predefined intervals by a respective node to determine a current network configuration.

Locally Significant Ring Identifier Processing

As described above, a node can be added to the network and can assign its own ring identifier to each of its connected rings without knowledge of a "global" identity for the respective rings (i.e., without knowing which ring is the inner ring or which is the outer ring). In this implementation, each ring takes on a locally significant identity. The process invoked by a node when added to a ring where ring identifiers only have local significance is shown in FIG. 3b. The process is invoked for each ring in the network. Process 320 begins by assigning a local ring identifier to the ring (322). A topology discovery packet is constructed that includes the address for the node and the local ring identifier (e.g., inner or outer ring) (324). The topology discovery packet is then routed to a respective ring (either inner or outer) (326). Thereafter, the process waits for return of the topology packet to the given node (328). When the topology packet(s) is(are) received, the data that has been appended to the topology packet by other nodes in the network is stored/updated in a topology table (330). In one implementation, a topology table is maintained for each respective ring in the network. The processes invoked by other nodes in the network to append data to a respective topology packet are discussed in greater detail below in FIG. 3d.

Figure 5:
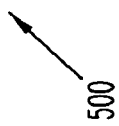
FIG. 5 shows an example of a topology table.

An example of a topology table 500 is shown in FIG. 5. The topology table can be associated with a single ring of the network, or information for both rings can be stored in a single table. In the example shown, information for both rings is included in a single table. The topology table includes an entry 502 for each node in the network that is discovered. Each entry 502 includes an address 504, a ring identifier for the node (either inner ring or outer ring) 506, and may include other information such as hop counts, latency data and an aging timer. The ring identifier can be used to determine the locally significant ring identifier for each node. The table includes two columns for ring identifiers, one associated with each of the nodes own rings. Alternatively, only one entry may be stored (since the second entry can be derived form the first).

Returning to process 320, after topology data for a given ring is stored/updated in step 330, routing decisions can be made based on the information stored in the topology table (332). As described above, routing decisions can be made based on destination data derived from header information associated with the packet. Other forwarding considerations may require the determination of whether the packet is wrap data. More specifically, routing decisions based on whether a packet is wrap data or not, can be made by comparing the ring identifier and source MAC address for a transit packet to the ring identifier associated with the same source node that is stored in the topology table. If the ring identifiers match, then the packet is not wrap traffic (i.e., the packet is transit traffic that was originally destined for the respective ring). Alternatively, if the ring identifiers do not match, the packet can be identified as wrap traffic, and an appropriate routing decision can be made.

Figure 3C:
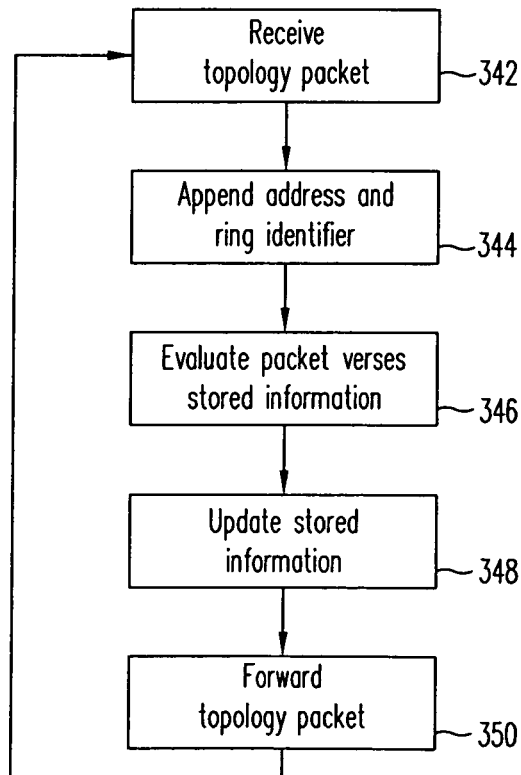
FIG. 3c is a flow chart illustrating a process for manipulating topology packets by a node in the network.
Figure 3D:
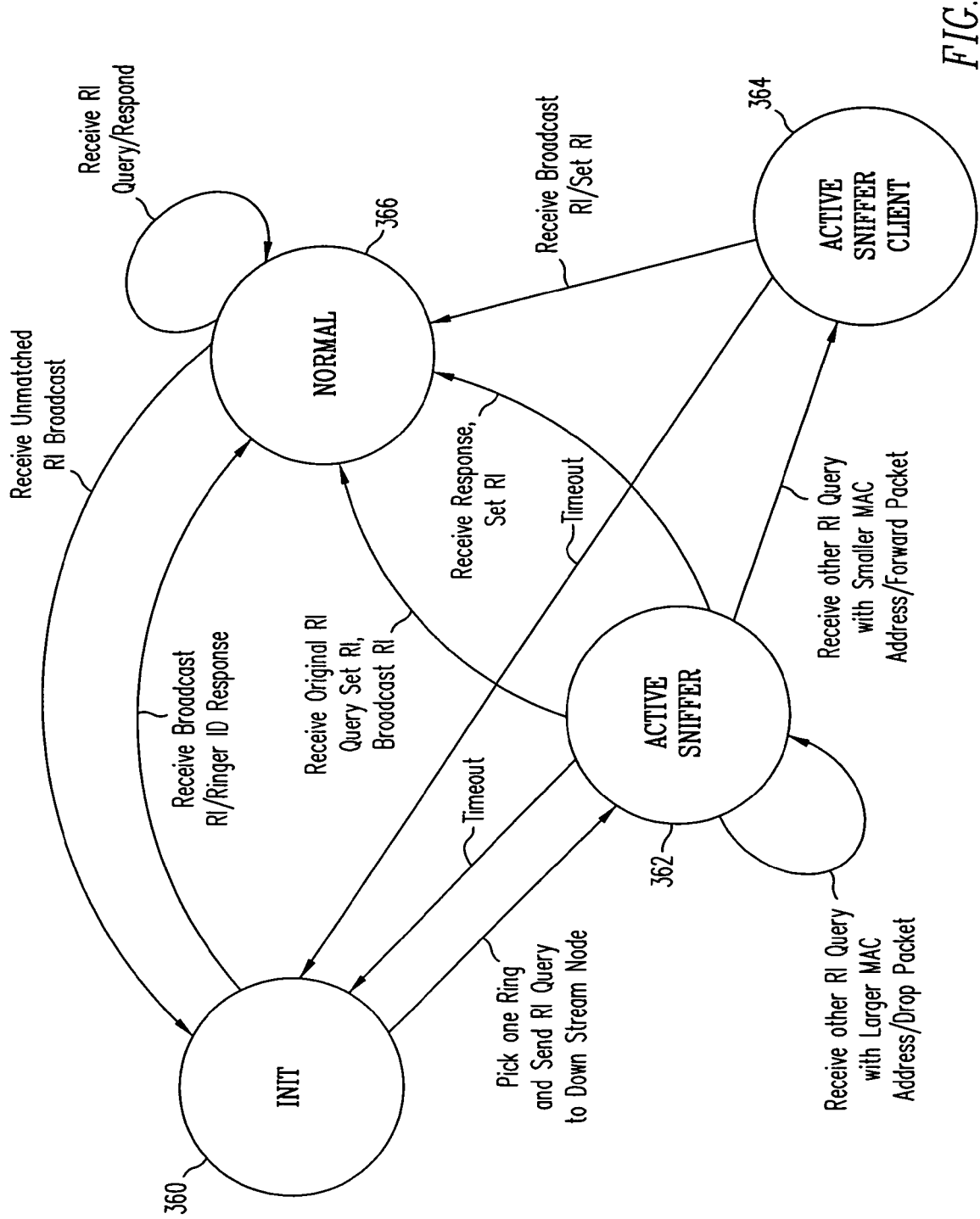
FIG. 3d is a flow chart illustrating a method for determining a ring identifier for a ring of a network.
Figure 3E:
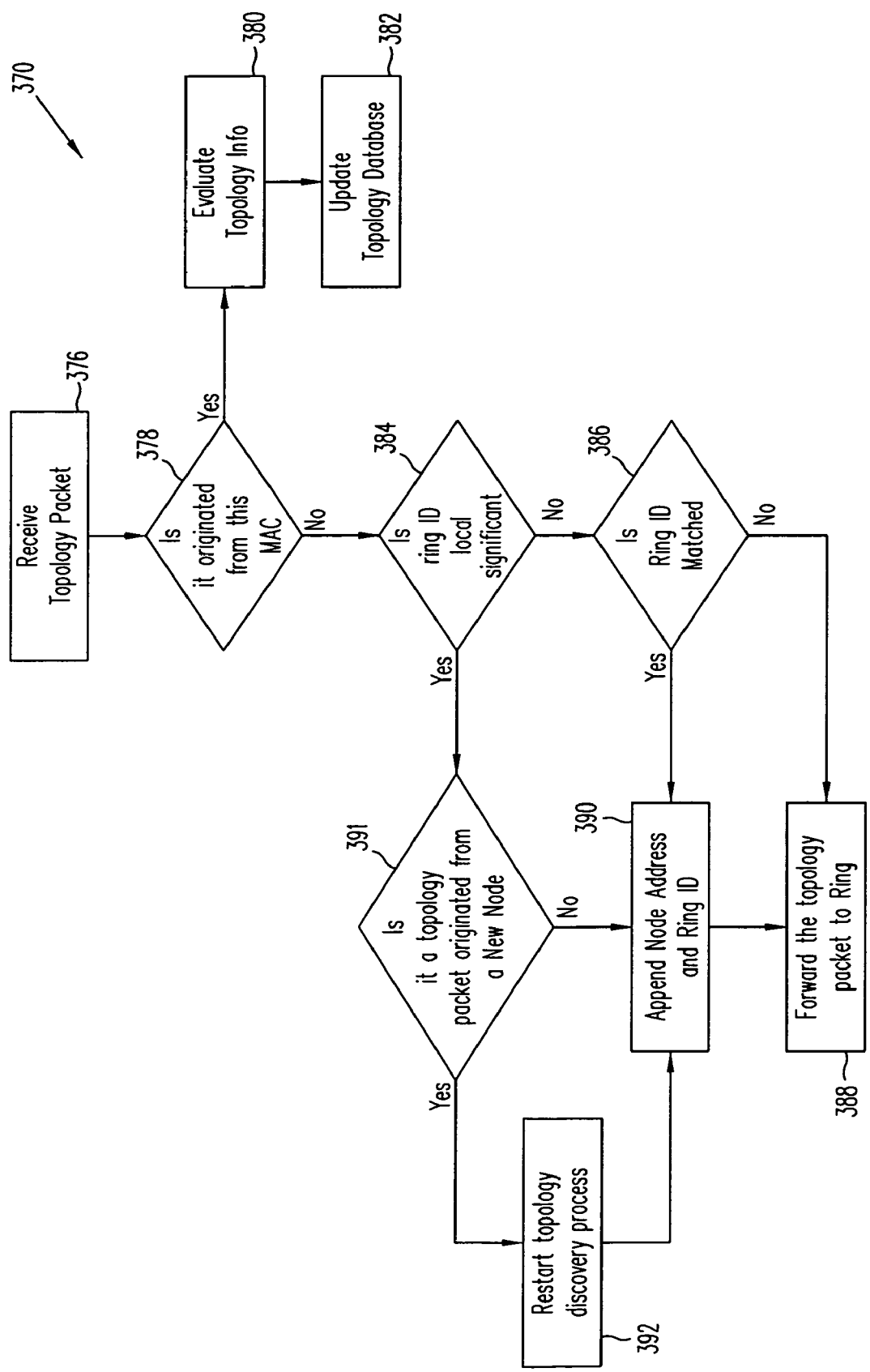
FIG. 3e is a flow chart illustrating a process for manipulating topology packets received by a given node where the ring identifier is either locally significant or predetermined.
Figure 3F:
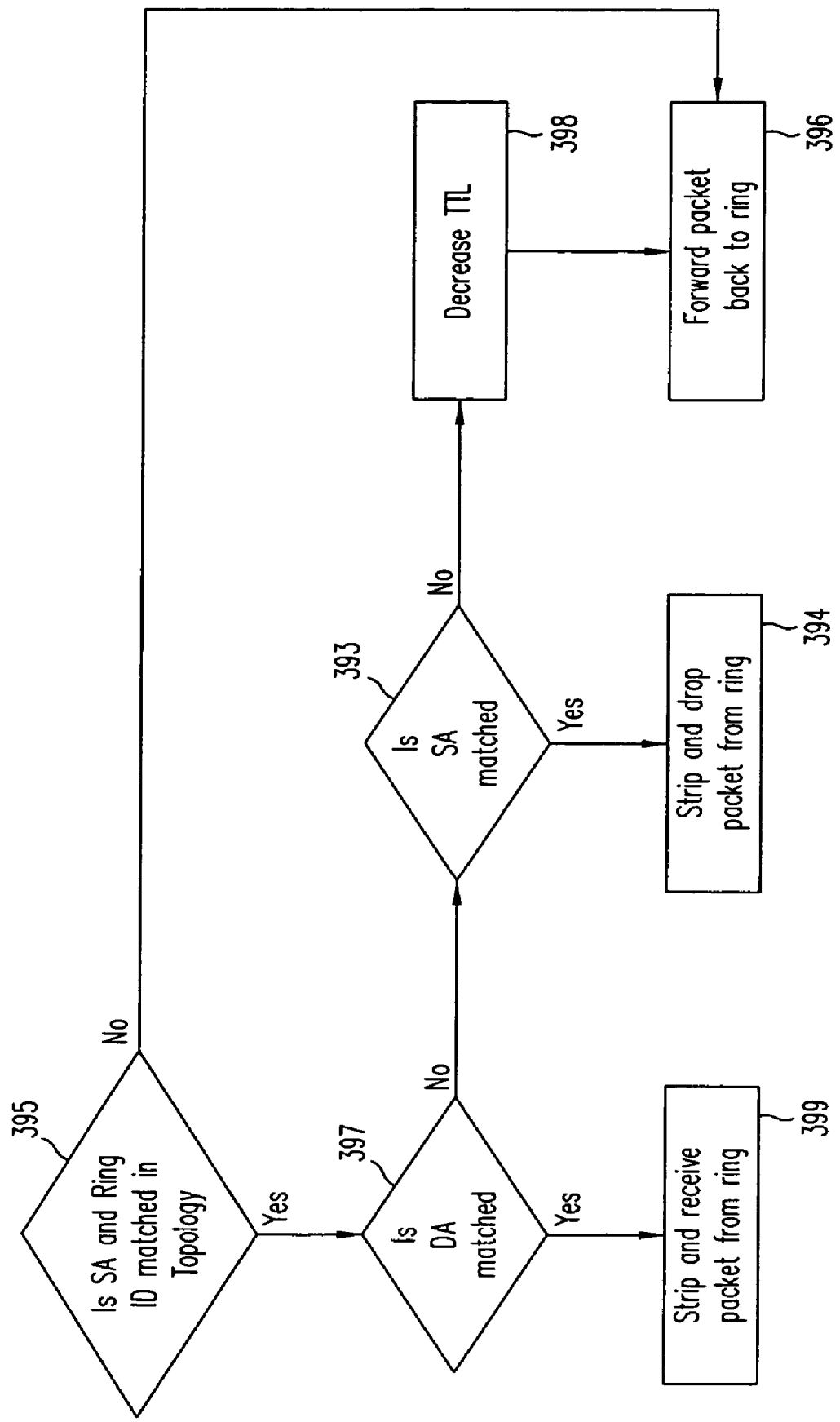
FIG. 3f is a flow chart illustrating a method for processing data packets in a node.

FIG. 3f shows a process for routing data packets that includes ring identifier processing. The process begins with the receipt of a packet (not shown). A check is made to determine if the source address and ring identifier for the packet matches a source address and ring identifier pair stored in the topology table associated with the ring on which the packet was received (i.e., checking to see if the packet is wrap traffic) (395). If a match is not located, the packet is forwarded back to the ring (396). If the packet was not wrap traffic, a check is made to determine if the destination address for the packet matches the current nodes MAC address (397). If the addresses match, then traffic is destined for the local node and the traffic is stripped accordingly from the ring (399). If the packet is not destined for the local node, then a check is made to determine if the source address for the packet matches the local node's source address (393). If the source address matches, then the packet is stripped from the ring and dropped (394) (i.e., the packet has circulated around the ring, never reached its intended recipient, and should be pulled from the ring and dropped). If the source address does not match, then a time to life counter in the header for the packet is decremented a predetermined amount (398). The time to life counter is used to prevent packets from circulating on the ring beyond a predetermined time. Thereafter, the non-matching packet is forwarded back to the ring on which it was received (396).

Turning to FIG. 3c, a process 340 is shown for manipulating topology packets received by a given node. Process 340 executes in systems where the ring identifier for each node is only locally significant. Another process, shown in FIG. 3e can be used where the ring identifier is either locally significant or predetermined.

The process begins with the receipt of a topology packet at a node (342). The node appends to the topology packet its address and ring identifier for the respective ring on which the packet was received (344). Each node that receives and processes the topology packet appends its address and local ring identifier to the topology packet. Accordingly, the topology packet accumulates information about the local ring identifiers for each node on a respective ring. The node also evaluates the information in the received topology packet as compared to the topology data that is stored in its topology table (346). Entries in the table are updated/created as appropriate (e.g., new entries are added or old entries are modified based on the information received) (348). The topology packet is forwarded to a next downstream node (350) and thereafter the process ends. The evaluation of the topology data in a received topology packet may occur before, during or after appending the local node's data to the topology packet. In one implementation, the topology packet is forwarded downstream as soon as the local node's data (address and ring identifier) are appended to the topology packet. At an originating node, the packet is stripped form the ring by comparing the original node's MAC address to the address of the first entry in the topology discovery packet. If the MAC address and ring id both matched, then the packet will be stripped from ring.

Ring Identifier Discovery

In a system where the ring identifier assigned by a node must be fixed and is not locally significant, but rather globally significant (e.g., each node must determine which ring the network has designated as the inner ring and the outer ring), a ring identifier discovery process can be invoked. The ring identifier discovery process is described in association with a state machine shown in FIG. 3d. Each node for each ring invokes the state machine to determine an appropriate ring identifier for a given ring. The state machine includes four states: an initialization state 360, an active sniffer state 362, a client sniffer state 364 and a normal state 366.

i. Initialization

All new nodes that are added to the network start in the initialization state 360. If a broadcast ring identifier is received, then the respective node can identify each of its rings and transition to the normal state 364. A broadcast ring identifier sets the ring identifier for a respective ring. In a dual ring topology network, the setting of one ring identifier necessarily sets the second ring identifier (i.e., if one ring is identified as the inner ring, the other ring is automatically identified as the outer ring). In one implementation, the node in the network at initialization having the smallest MAC address sets the ring identifier. In another implementation, the node in the network having the largest MAC address sets the ring identifier. The broadcasting of ring identifiers is described more in association with the normal state 366. Alternatively, the node may receive a ringer identifier response. The ringer identifier response is generated by another node in the network in response to a ringer identifier request generated by the node. A ringer identifier response sets the ringer identifier for the node (confirming the request data). After receiving a ringer identifier response, the node transitions to the normal state. Ringer identifier responses are discussed in greater detail below. If no broadcast ring identifier or response is received, then the node transitions to the active sniffer state 362. The transition includes the selection of a proposed ring identifier for a ring and the construction of ring identifier query packet that includes the proposed ring identifier for the one ring. The ring identifier query packet is forwarded to a downstream node on the one ring.

ii. Active Sniffer

While in the active sniffer state 362, the node waits to receive query packets or a response. If a response is received (e.g., the node is being added to a network where the ring identity has already been established), then the ring identifier for the ring is set based on the response information. The response information can be in the form of a confirmation or denial (i.e., the proposed ring identifier selection included in the node's query packet was correct or incorrect for the given ring). The response typically is received from a node on an opposite ring than the query packet is transmitted. Upon receiving the response and setting the appropriate ring identifier, the node transitions to the normal state 368.

If a query packet is received, the node may or may not transition to another state. If the query packet is the original query packet generated by the node, and if the query packet is received on the same ring (e.g., the packet has not been wrapped onto another ring due to a failure in the network), then the node will transition to the normal mode 366. As part of the transition, the node will set the ring identifier for the one ring to a same value as the proposed ring identifier. In addition, the node will broadcast the ring identifier for the ring to the remaining nodes in the network on the ring.

If the query packet received is from another node, then the query packet must be evaluated. More specifically, the MAC address associated with the query packet is compared to the node's MAC address. In an implementation where the node with the smallest MAC address sets the ring identifier for the network, if the MAC address is smaller than the node's MAC address then the node transitions to the client sniffer state 364. The transition includes forwarding the query packet to a next node. If the MAC address is larger, then the query packet is discarded and the node remains in the active sniffer state. In an implementation where the node with the largest MAC address sets the ring identifier, then the transitions are reversed appropriately.

Finally, upon a predefined timeout, if no other transition has been made, the node will transition back to the initialization state 360.

iii. Active Client Sniffer

In the active client sniffer state 364, the node waits for a broadcast identifier, a timeout or receipt of the original ring identifier query. In the active client sniffer state, the node has determined that it will not set the ring identifier (i.e., its MAC address was either too big or small as compared to the MAC address for another node in the network that generated a query packet). If a broadcast ring identifier is received, then the node transitions to the normal state 366. The transition includes setting the ring identifier for the rings of the node in accordance with the broadcast ring identifier received. If the timeout occurs or the node's original ring identifier query is received, then the node transitions back to the initialization state 360. The node might receive its own ring identifier query back but yet know that it should not set the ring identifier. This may arise when a new node with a lower/higher MAC address has been added after the node sent its original query packet. In this case, the node should transition back to the initialization state and allow the other node to set the ring identifier as appropriate.

iv. Normal

In the normal state, the ring identifiers for the node have been set. If queries are received from another node, a response can be generated that includes the ring identifier confirmation/denial. The node does not transition from the normal state to any other state absent receipt of a broadcast ring identifier that does not match. If a non-matching broadcast identifier is received, the node transitions back to the initialization state.

Topology Discovery Packet Processing

Each node in the network sends out topology discovery packets periodically on each of the inner and outer rings to collect topology information. In one implementation, the information gathered is stored in a topology table and used in making routing decisions for host packets. The topology table can be stored in a memory for the node. An example of a topology table that includes topology information is shown in FIG. 5.

Each entry includes an address 502 (e.g., a MAC address) for a node (e.g., a destination node) discovered in the network. Local ringer identifier data 503 for each ring can be discovered from the topology discovery packets received at initialization. Hop count data for each of the inner 504 and outer rings 506 can be determined from topology packet data and stored for each node as a measure of the number of hops from the current node. A latency metric for each of the inner 508 and outer rings 510 can be determined and stored for each node. The latency metric can be calculated as the amount of delay between the current node (the node that is generating and storing the table) and a given destination node (an entry in the table) on a given ring. The table can also include a static ring direction 512 and a dynamic ring direction 514. The static ring direction 512 indicates the ring that should be selected based on a shortest path determination. The dynamic ring direction 514 indicates a ring selection based on the dynamic ring selection protocol that takes into consideration congestion on each ring. When new packets are received, the table can be indexed (based on destination data for the packet) to determine proper ring selection.

When nodes are added to a network as described above with respect to FIG. 3*a*, entries in the table can be augmented as each topology packet or usage packet is processed. Referring now to FIG. 3*e*, a method 370 for processing topology packets by a node is shown. The first two steps of the process are not shown and relate to the generation of topology discovery packets by a node for discovery of topology information. A topology discovery packet includes an address for a given node and a ring identifier associated with the ring on which the information is being gathered. A topology packet can be generated at predefined intervals to discover information about the network. Once generated, each can be forwarded to a downstream node on a respective ring.

When a topology discovery packet is received (376), a check is made to determine if the topology packet was generated by the receiving node (378). If so, then the topology information is evaluated (380) and stored/updated in the topology table as appropriate (382). More specifically, entries in the topology table can be added or entries updated based on the received topology information. If the topology packet was not generated by the receiving node, then a check is made to determine if the ring identifier for the node has local significance only (384). If not, then a check is made to determine if the ring identifier associated with the topology discovery packet matches the ring identifier associated with the ring on which the packet was received (386). If no match arises, then the packet is forwarded without appending any information relating to the receiving node to the topology discovery packet (388) and thereafter the process can continue at step 376. If the ring identifier matches, then the address for the receiving node is appended to the topology packet, and as appropriate, the ring identifier associated with the ring on which the packet was received is appended to the topology packet as well (390). Thereafter, the packet is forwarded at step 388.

If the ring identifier only has local significance, then a check is made to determine if the topology packet originated from a new node (391). If the topology packet did not originate from a new node, the process continues at step 390. If the topology packet originated from a new node, then the topology discovery process may be restarted (including the generation and dissemination of a new topology discovery packet) (392). When a new node is introduced, the topology discovery process may be used to discover the node. Alternatively, the data for the new node can be obtained from the "new" topology packet that is received. After processing the "new" topology packet, the process continues at step 390. At step 390, the address for the receiving node is appended to the topology discovery packet, and as appropriate, the ring identifier. Each node that receives and processes the topology packet appends its address and local ring identifier to the topology discovery packet if the ring identifier only has local significance. Accordingly, the topology discovery packet accumulates information for each node on a respective ring. The node also evaluates the information in the received topology discovery packet as compared to the topology data that is stored in its topology table. Entries in the table are updated/created as appropriate (e.g., new entries are added or old entries are modified based on the information received). Thereafter, the topology discovery packet is forwarded to a next node (388). The evaluation of the topology data in a received topology discovery packet may occur before, during or after appending the local node's data to the topology discovery packet. In one implementation, the topology discovery packet is forwarded as soon as the local node's data (address and ring identifier) are appended to the topology discovery packet.

A number of implementations of the invention have been described. Nevertheless, it will be understood that various modifications may be made without departing from the spirit and scope of the invention. For example, the topology table can be stored in a content addressable memory for faster look-ups. One or more numbered elements may be implemented with the same element. Accordingly, other implementations are within the scope of the following claims.

What is claimed is:

1. A node in a network comprising:
 a first network interface operable to be coupled to a first ring transmission media;
 a second network interface operable to be coupled to a second ring transmission media;
 a memory; and
 a discovery state machine coupled to the memory and the first and second network interfaces; wherein the discovery state machine is configured to:
  select a ring identifier for each of the first and second ring transmission media;
  discover topology information for the network including an identity of each node coupled to the first and second ring transmission media;
  store the topology information in the memory; and
  determine routing decisions for one or more packets received at the node along each of the first and second ring transmission media using the topology information.

2. The node of claim 1 wherein the discovery state machine is further configured to:
 generate a ring query packet including a proposed ring identifier for the first ring transmission media; and
 forward the ring query packet to a next node on the first ring transmission media.

3. The node of claim 2 wherein the discovery state machine is further configured to:
 receive a response that includes information for determining a correct ring identifier for the first ring transmission media.

4. The node of claim 1 wherein the discovery state machine is further configured to:
 set a locally significant ring identifier for each of the first ring transmission media and the second ring transmission media without concern for a ring identifier established by any other node in the network for either of the two ring transmission media;

discover locally significant ring identifiers for each other node coupled to the network; and store the locally significant ring identifiers and associated node addresses for each node in the network in the memory.

5. The node of claim 1 wherein the discovery state machine further comprises at least one of a microsequencer and a reuse protocol forwarding logic.

6. A method comprising:
receiving a first topology discovery packet from a first node in a network, wherein the first topology discovery packet includes ring identifier information about a first network ring on which the first topology discovery packet is received;

determining that the first topology discovery packet is from a node new to the network;

extracting at least one of the ring identifier information and other topology information from the first topology discovery packet;

creating a second topology discovery packet in response to the first topology discovery packet; and transmitting the second topology discovery packet to a second node in the network.

7. The method of claim 6 further comprising:
storing the at least one of the ring identifier information and the other topology information in a topology table.

8. The method of claim 6 wherein the ring identifier information is determined by a node in the network having one of a smallest MAC address and a largest MAC address.

9. The method of claim 6 wherein the transmitting the second topology discovery packet to a second node in the network further comprises at least one of:
transmitting the second topology discovery packet to the second node in the network on the first network ring; and
transmitting the second topology discovery packet to the second node in the network on a second network ring.

10. The method of claim 6 wherein the first topology discovery packet is formed and transmitted in response to a third topology discovery packet received at a third node and including the ring identifier information about the first network ring.

11. The method of claim 6 wherein the ring identifier information is determined by the first node.

12. An apparatus comprising:
a means for receiving a first topology discovery packet from a first node in a network, wherein the first topology discovery packet includes ring identifier information about a first network ring on which the first topology discovery packet is received;

a means for determining that the first topology discovery packet is from a node new to the network;

a means for extracting at least one of the ring identifier information and other topology information from the first topology discovery packet;

a means for creating a second topology discovery packet in response to the first topology discovery packet; and a means for transmitting the second topology discovery packet to a second node in the network.

13. A method comprising:
receiving a first topology discovery packet from a first node in a network, wherein the first topology discovery packet includes ring identifier information;

determining whether the ring identifier information matches local ring identifier information for a first network ring on which the first topology discovery packet is received; and forwarding the first topology discovery packet to a second node without changing the first topology discovery packet or storing information from the first topology discovery packet in a topology table when the ring identifier information fails to match local ring identifier information for the first network ring on which the first topology discovery packet is received.

14. The method of claim 13 further comprising:
creating a second topology discovery packet in response to the first topology discovery packet when the ring identifier information matches local ring identifier information for the first network ring on which the first topology discovery packet is received; and transmitting the second topology discovery packet.

15. The method of claim 14 further comprising:
storing at least one of the ring identifier information and the other topology information from the first topology discovery packet in the topology table.

16. The method of claim 14 wherein the transmitting the second topology discovery packet further comprises at least one of:
transmitting the second topology discovery packet on the first network ring; and
transmitting the second topology discovery packet on a second network ring.

17. The method of claim 13 wherein the first topology discovery packet is formed and transmitted in response to a third topology discovery packet received at a third node and including the ring identifier information about the first network ring.

18. The method of claim 13 wherein the ring identifier information is determined by the first node.

19. The method of claim 13 wherein the ring identifier information is determined by a node in the network having one of a smallest MAC address and a largest MAC address.

20. An apparatus comprising:
a means for receiving a first topology discovery packet from a first node in a network, wherein the first topology discovery packet includes ring identifier information;

a means for determining whether the ring identifier information matches local ring identifier information for a first network ring on which the first topology discovery packet is received; and a means for forwarding the first topology discovery packet to a second node without changing the first topology discovery packet or storing information from the first topology discovery packet in a topology table when the ring identifier information fails to match local ring identifier information for the first network ring on which the first topology discovery packet is received.

21. The apparatus of claim 20 further comprising:
a means for creating a second topology discovery packet in response to the first topology discovery packet when the ring identifier information matches local ring identifier information for the first network ring on which the first topology discovery packet is received; and a means for transmitting the second topology discovery packet.

* * * * *